United States Patent [19]
Sakashita et al.

[11] Patent Number: 5,969,744
[45] Date of Patent: Oct. 19, 1999

[54] RECORDING HEAD AND IMAGE FORMING APPARATUS USING THE SAME

[75] Inventors: Yukihiko Sakashita, Hadano; Akihiro Matsushita, Zama, both of Japan

[73] Assignee: Canon Kabushiki Kaisha, Tokyo, Japan

[21] Appl. No.: 08/812,306

[22] Filed: Mar. 5, 1997

[30] Foreign Application Priority Data

Mar. 6, 1996 [JP] Japan .................................. 8-049100

[51] Int. Cl.⁶ .............................. B41J 2/45; H01L 33/00
[52] U.S. Cl. ........................................... 347/237; 347/130
[58] Field of Search .................................. 347/237, 238, 347/132, 130; 345/82, 44

[56] References Cited

U.S. PATENT DOCUMENTS 5,451,977  9/1995  Kusuda et al. ............................. 345/44

FOREIGN PATENT DOCUMENTS

| | | | |
|---|---|---|---|
| 0 782 934 | 7/1997 | European Pat. Off. | B41M 5/38 |
| 0 858 906 | 8/1998 | European Pat. Off. | B41M 5/00 |
| 59-222381 | 12/1984 | Japan | B41M 5/00 |
| 1-238962 | 9/1989 | Japan . | |
| 2-288375 | 11/1990 | Japan | H01L 33/00 |
| 4-117709 | 4/1992 | Japan | H03F 3/343 |
| 7-237348 | 9/1995 | Japan | B41M 5/00 |
| 08-002090 | 1/1996 | Japan | B41M 5/00 |

OTHER PUBLICATIONS

European Search Report, dated Nov. 27, 1998, from European Patent Application No. EP 98 11 8058.

*Primary Examiner*—N. Le
*Assistant Examiner*—Shih-Wen Hsieh
*Attorney, Agent, or Firm*—Fitzpatrick, Cella, Harper & Scinto

[57] ABSTRACT

A recording head includes a light emitting element array comprised of a plurality of light emitting elements and a plurality of switch elements for scanning the plurality of light emitting elements, and a drive device for driving the light emitting element array. The drive device has a variable resistor in a route for supplying a driving current to the plurality of switch elements. The control voltage of the variable resistor is varied to thereby adjust the driving current for the plurality of switch elements.

6 Claims, 8 Drawing Sheets

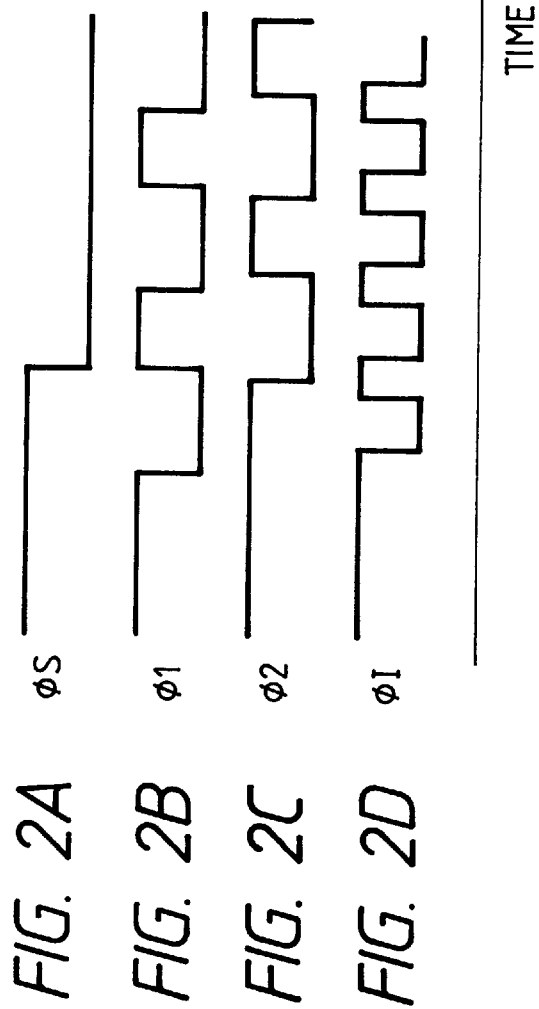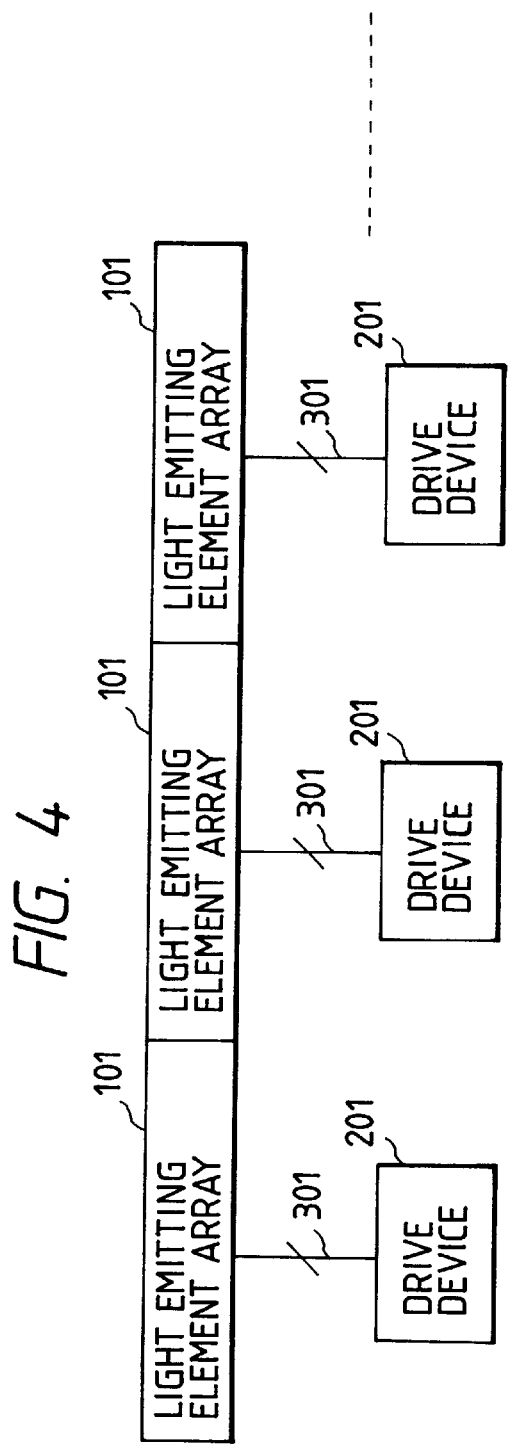

| FIG. 7A | FIG. 7B |

RECORDING HEAD AND IMAGE FORMING APPARATUS USING THE SAME

BACKGROUND OF THE INVENTION

1. Field of the Invention

This invention relates to a drive device for a light emitting element array for use in the recording head of an image forming apparatus such as a copying apparatus or a printer, and particularly a light emitting element array having a self-scanning function.

2. Related Background Art

An example of a light emitting element array having a self-scanning function is described, in U.S. Pat. No. 5,451, 977, Japanese Laid-Open Patent Application No. 1-238962, etc. This light emitting element array uses a light emitting thyristor as a basic element, and by effecting the coupling of the potential between the gates thereof, it has the shift register function of the light emission of the light emitting thyristor and effects self-scanning. By thus letting the light emitting element array itself have the self-scanning function, the compactness of the light emitting element array and the shorter pitch of the light emitting elements can be achieved, and the number of wires between the light emitting element array and a drive element for driving it can be greatly reduced.

FIG. 1 of the accompanying drawings is a diagram showing the equivalent circuit of such a light emitting element array having the self-scanning function. In FIG. 1, there is shown the circuit of a portion of the light emitting element array. In FIG. 1, reference characters S1–S4 designate switch elements for transfer (thyristors), and the anode terminal of each switch element is connected to a power source line $V_{DD}$. The cathode terminals of odd number ones of the switch elements are connected to a clock line CL1 and the cathode terminals of even number ones of the switch elements are connected to a clock line CL2. A transfer clock $\phi 1$ for driving the switch elements is supplied to the clock line CL1 through a resistor R1, and a transfer clock $\phi 2$ is supplied to the clock line CL2. Reference characters D1–D3 denote diodes for coupling that are connected in series, and the gate terminals of corresponding switch elements are connected to the anode terminals of the respective diodes.

Also, resistors $R_{G1}$–$R_{G3}$ are provided corresponding to the respective switch elements. One end of each resistor is connected to a power source $V_{GA}$, and the other ends of the resistors are connected to the gate terminals of the corresponding switch elements. These switch elements for transfer, the diodes for coupling and the resistors together constitute a self-scanning circuit. Character $\phi$S designates a start pulse for instructing to start transfer, and it is supplied to the gate terminal of the top switch element S1. Characters L1–L4 denote light emitting thyristors which are light emitting elements. The anode terminals of the light emitting thyristors are connected to the power source line $V_{DD}$, the cathode terminals of the light emitting thyristors are connected to a clock line CLI, and the gate terminals of the light emitting thyristors are connected to the gate terminals of the corresponding switch elements. A drive signal $\phi 1$ for driving the light emitting thyristors is supplied to the clock line CLI through a resistor RI.

The operation of the above-described light emitting element array will now be described with reference to FIGS. 2A to 2D of the accompanying drawings. FIG. 2A shows the start pulse $\phi$S, and the start pulse $\phi$S of a high level is supplied to the anode terminal of the diode D1 when it instructs to start the operation. At the point of time whereat the start pulse $\phi$S has been supplied, the transfer clocks $\phi 1$ and $\phi 2$ and the drive signal are at a high level (5V) and in this state, the cathode voltages of all switch elements and light emitting thyristors are nearly 5V and therefore, the switch elements and the light emitting thyristors are in their OFT state. Also, the start pulse $\phi$S is at a high level and therefore, assuming that the forward drop voltage of the diodes is about 1V, the gate voltages of the switch elements become lower in succession due to the voltage drop of the diode for coupling in such a manner that the gate voltage of the top switch element S1 is 5V, the gate voltage of the next switch element S2 is 4V and the gate voltage of the next switch element S3 is 3V.

When thus in the high level state of the start pulse $\phi$S, the transfer clock $\phi 1$ assumes a low level as shown in FIG. 2B, the switch element S1 of which the gate voltage is highest of the switch elements connected to the clock line CL1 assumes its ON state because the switch elements become ON when the cathode voltages thereof become lower, by diffusion potential $V_{dif}$, than the gate voltages thereof. In this case, the cathode voltage of each switch element is substantially constant and therefore, the other switch elements connected to the clock line CL1 remain OFF. The gate voltage of the switch element S1 becomes nearly $V_{DD}$. Also, when the switch element S1 becomes ON, the electric current thereof flows to the resistor R1, and since the cathode voltage of the switch element S1 at this time is substantially constant, the current value flowing to the switch element S1 is determined by the resistance value of the resistor R1.

When in the ON state of the switch element S, the drive signal $\phi 1$ assumes a low level as shown in FIG. 2D, the light emitting thyristor L1, of which the gate voltage is the highest of the light emitting thyristors connected to the clock line CLI becomes ON and emits light. The other light emitting thyristors, remain OFF. The electric current of the light emitting thyristor L1 flows to the resistor RI, and since at this time, the cathode voltage of the light emitting thyristor L1 is substantially constant, the current value of the light emitting thyristor L1 is determined by the resistance value of the resistor RI. Also, the emitted light intensity of the light emitting thyristor is determined by the electric current thereof.

When as shown in FIG. 2D, the drive signal $\phi$I is brought to a high level after the light emitting thyristor L1 has emitted light for a predetermined time, the cathode voltage of the light emitting thyristor L1 becomes $V_{DD}$ and, therefore, the light emitting thyristor L1 becomes turned off. Next, as shown in FIG. 2C, the transfer clock $\phi 2$ is brought to a low level, the switch element S2, of which the gate voltage is the highest of the switch elements, connected to the clock line CL2 becomes ON, and the gate voltage thereof becomes nearly 5V. When in this state, as shown in FIG. 2B, the transfer clock $\phi 1$ is brought to a high level and as shown in FIG. 2A, the start pulse $\phi$S is brought to a low level, the cathode voltage of the switch element S1 becomes $V_{DD}$ and this switch element becomes OFF, and the gate voltage thereof becomes 0V.

As a result of this, the ON state is transferred from the switch element S1 to the switch element S2, and the light emitting thyristor L2 is turned on by the next drive signal $\phi$I and emits light for a predetermined time. In this manner, the switch element S1 is switched on by the start pulse $\phi$S, and the switch elements in their ON state are transferred by 1 bit each by the transfer clocks $\phi 1$ and $\phi 2$. Along with it, the light emitting thyristors are successively shifted and the individual light emitting thyristors are driven in conformity with the drive signal, whereby the scanning of the light emitting thyristors which are light emitting elements is effected. Here, the transfer clocks $\phi 1$, $\phi 2$ and the drive signal $\phi I$ are applied through the resistors R1, R2 and RI, respectively, and the resistance values of the respective resistors are set so as to be optimum current values for the respective elements.

However, in the light emitting element array having the self-scanning function as described above, there is a range in the electric current of the switch elements within which normal transfer can be effected, and if the current value deviates from the range, the light emitting element array sometimes may not operate normally. Also, the light emitting element array has irregularity of manufacture and therefore, irregularity also occurs in the range of the electric current within which normal transfer is effected, depending on individual light emitting element arrays. In such a case, the range of the electric current for effecting the normal transfer of the switch elements is narrow and the driving condition is severe, and this has led to the problem that bad products are created due to the irregularity of manufacture of the light emitting element array, reducing the yield. Generally, when the light emitting element array is used in a recording head or the like, a plurality of light emitting element arrays are used while being connected in series on a substrate and therefore, if even one of them is bad, the substrate becomes a bad product (N.G.), and this has led to the problem that the cost of the apparatus is made remarkably high.

Also, when the light emitting element array of FIG. 1 is to be driven, a signal is supplied to the switch elements through the resistors R1 and R2 for limiting the electric current and therefore, if the resistors R1 and R2 are interchanged and adjusted so as to assume an optimum value in conformity with the irregularity of manufacture of the switch elements, much time is required for the selection and adjustment of the resistance values. This has led to the problem that the making of the apparatus is difficult. Further, in the prior art, the emitted light intensity of the light emitting thyristors is determined by the driving current and therefore, to record an image free of irregularity, it is necessary to suppress the irregularity of the driving current for the light emitting thyristors. However, the driving current for the light emitting thyristors is determined by characteristics such as the current and output resistance of the drive circuit itself or the resistor RI and therefore, to further improve the quality of image, it has been necessary to suppress the irregularity of these factors.

SUMMARY OF THE INVENTION

So, it is an object of the present invention to provide, in view of the above-noted problems peculiar to the prior art, a recording head using a light emitting element array in which the electric current of switch elements can be simply adjusted to thereby contribute to an improvement in the yield of the light emitting element array.

It is also an object of the present invention to provide a recording head using a light emitting element array in which the irregularity of a driving current for light emitting elements can be suppressed to thereby improve the quality of an image.

The above objects of the present invention are achieved by a recording head using a light emitting element array having a plurality of light emitting elements arranged in a row, and a plurality of switch elements of which the operations successively shift in conformity with a transfer clock from the outside and for scanning said light emitting elements, characterized in that a variable resistor is provided in a route for supplying a driving current to the switch elements, and the control voltage of the variable resistor is varied to thereby adjust the driving current for the switch elements.

Also, the above objects of the present invention are achieved by a recording head using a light emitting element array having a plurality of light emitting elements arranged in a row, and a plurality of switch elements of which the operations successively shift in conformity with a transfer clock from the outside and for scanning said light emitting elements, characterized in that a driving signal is supplied to the light emitting elements through an external resistor for limiting an electric current and the resistance value of the internal resistor of an output circuit outputting the driving signal is made smaller than the resistance value of the external resistor.

BRIEF DESCRIPTION OF THE DRAWINGS

FIGS. 2A, 2B, 2C and 2D are time charts for illustrating the operation of the light emitting element array of FIG. 1.

FIG. 4 schematically shows a construction in which a recording head is constructed by the use of the light emitting element arrays and the drive devices of the embodiment shown in FIG. 3.

DESCRIPTION OF THE PREFERRED EMBODIMENTS

Figure 1:
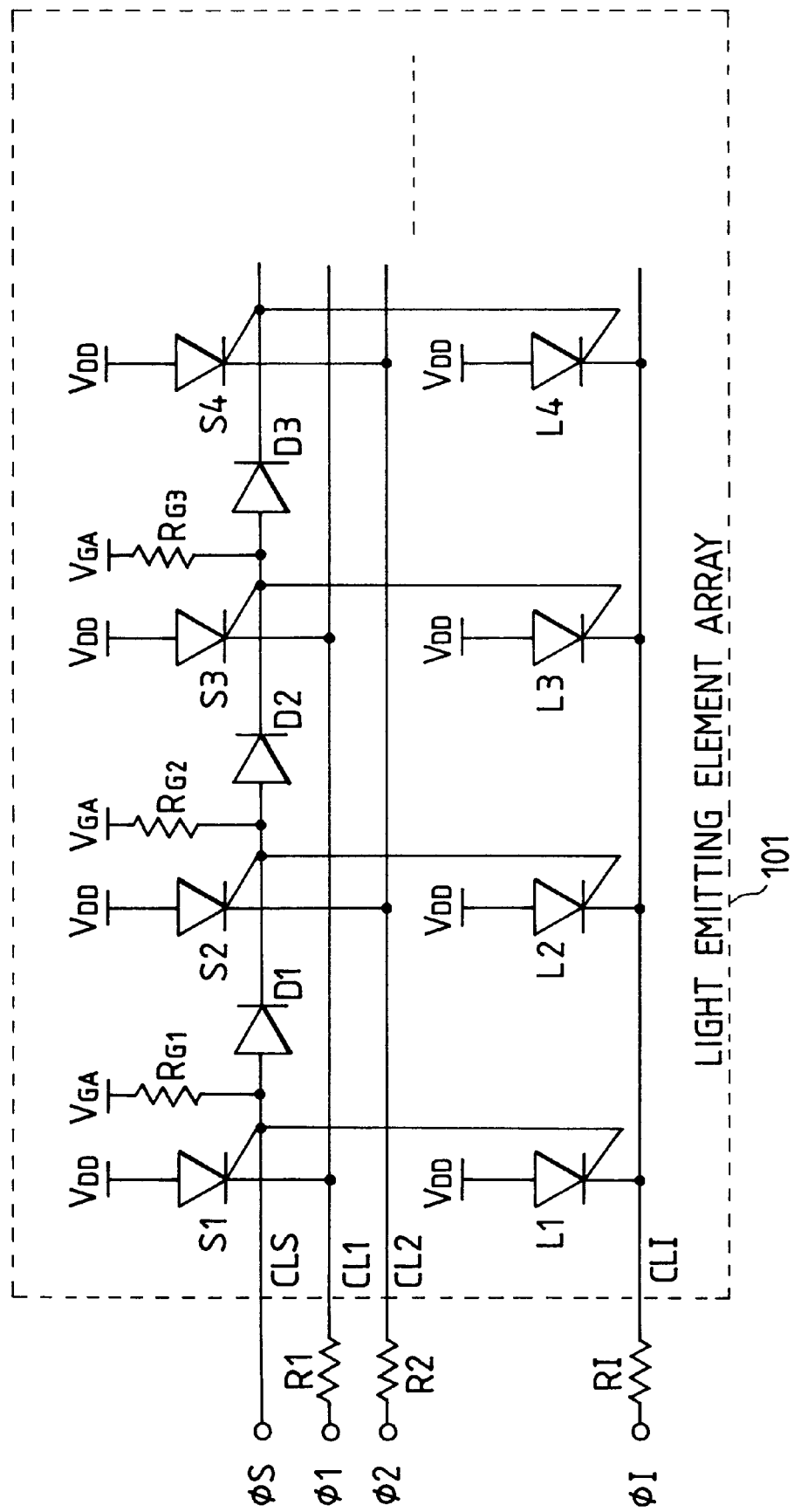
FIG. 1 is a circuit diagram showing an example of a light emitting element array having a self-scanning function.
Figure 3:
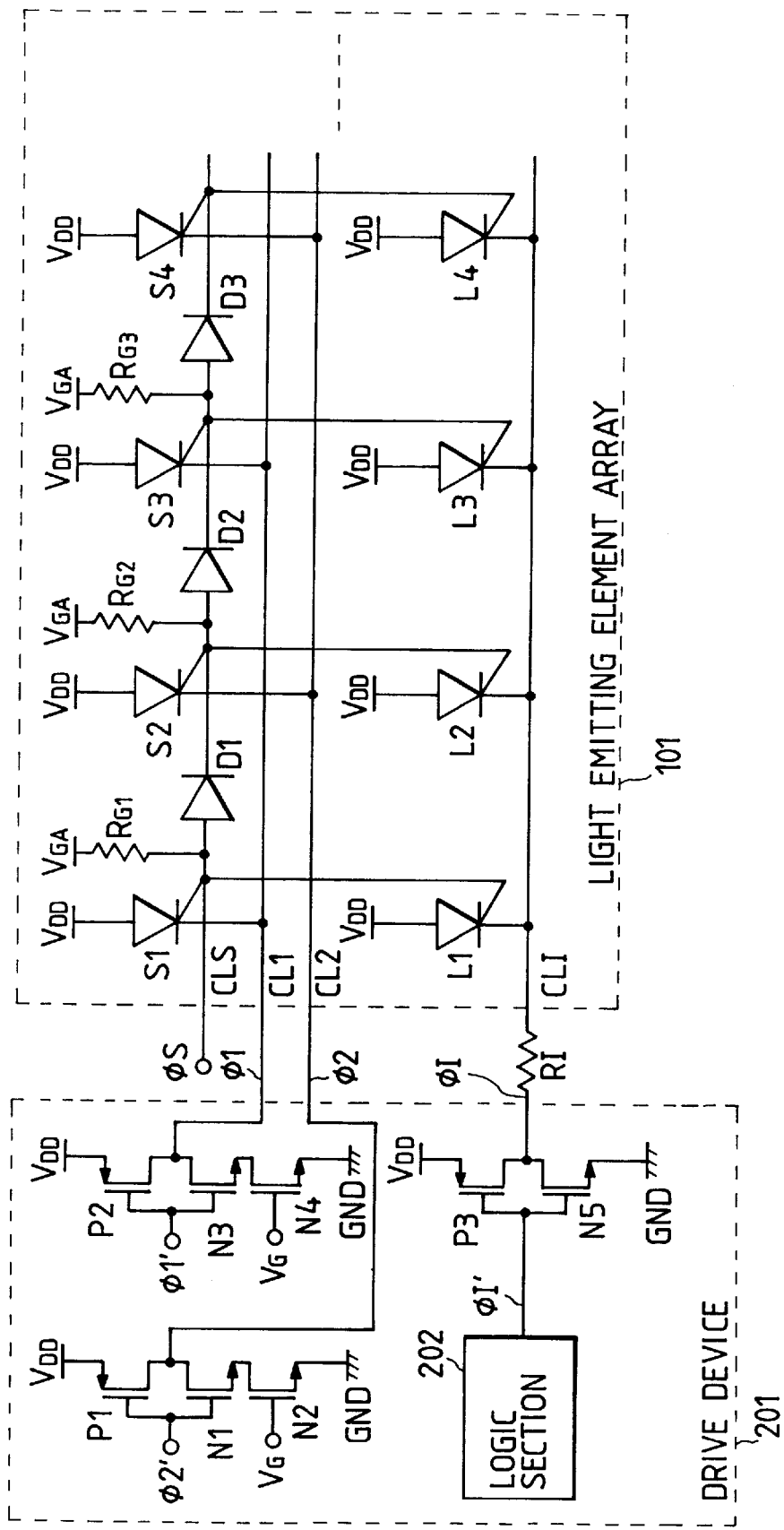
FIG. 3 is a circuit diagram showing an embodiment of the present invention.

Some embodiments of the present invention will hereinafter be described in detail with reference to the drawings. FIG. 3 is a circuit diagram best representing the features of a light emitting element array and a drive device used in the recording head of the present invention. In FIG. 3, reference numeral 101 designates a light emitting element array having a self-scanning function, and reference numeral 201 denotes a drive device for driving the light emitting element array 101. The light emitting element array 101 is entirely the same as that shown in FIG. 1 and therefore, the construction and operation thereof need not be described. The drive device 201 includes an output circuit for outputting a transfer clock $\phi 1$ to the clock line CL1 of the light emitting element array 101 described with reference to FIGS. 1 and 2, an output circuit for outputting a transfer clock $\phi 2$ to the clock line CL2, and an output circuit for outputting a driving signal $\phi I$ to the clock line CLI.

Also, in the drive device 201, there is provided a logic section 202 for generating a start pulse $\phi S$, transfer pulses $\phi 1'$ and $\phi 2'$ and a driving signal $\phi I'$. The clock line CL1 is a connection line to which, as previously described, the cathode terminals of odd number switch elements S1, S3, . . . of switch elements for transfer (thyristors) in the light emitting element array 101 are connected in common, and the clock line CL2 is a connection line to which the cathode terminals of even number switch elements S2, S4, . . . are connected in common. Also, the clock line CLI is a connection line to which the cathode terminals of the light emitting thyristors of the light emitting element array 101 are connected in common.

The output circuit for outputting the transfer pulse φ1, as shown in FIG. 3, is a circuit comprising a combination of a P channel type MOS transistor P2 and an N channel type MOS transistor N3, and the transfer pulse φ1 is supplied from the logic section 202 to the gate terminals of the transistors P2 and N3 which are connected in common. In this case, the output circuit is such that the input and output thereof are opposite in phase to each other, and is designed to reverse the transfer pulse φ1' from the logic section 202 and output it as the transfer pulse φ1 to the clock line CL1. Also, in the present embodiment, an N channel type MOS transistor N4 is connected in series with the transistor N3, and the control voltage $V_G$ of the gate terminal of the transistor N4 can be varied to thereby vary the resistance value across the drain source of the transistor N4 and adjust the operating current of the switch elements for transfer. The control voltage $V_G$ is supplied from a control section outside the drive device 201.

When the transfer pulse φ1' of the logic section 202 assumes a low level, the MOS transistor P2 is turned on and the MOS transistor N3 is turned off, and as shown in FIG. 2B, the transfer pulse φ1 of a high level is supplied to the clock line CL1. Also, when the transfer pulse φ1' assumes a high level, the transfer pulse φ1 is inverted to a low level in response thereto, and operates so as to switch on the switch elements as previously described. Also, the transfer pulse φ1 is directly supplied to the clock line CL1, and when the transfer pulse φ1 assumes a low level, for example, the switch element S1 of the odd number switch elements is switched on, and a driving current is supplied from a power source $V_{DD}$ to GND via the switch element S1, the MOS transistor N3 and the MOS transistor N4.

In this case, during adjustment, the control voltage $V_G$ of the gate terminal of the MOS transistor N4 is varied in advance, whereby the resistance value across the drain source of the transistor N4 is adjusted. That is, the resistance value of the MOS transistor N4 is made variable, whereby even if irregularity occurs to the electric current of the switch elements due to the irregularity of manufacture or the like, the operating current of the switch elements is adjusted so as to fall within a range in which normal transfer can be effected. By doing this, not only can the operating current be adjusted simply and within a short time, but also the adjustment range of the operating current is made wide and the fine adjustment of the current is also possible. Therefore, light emitting element arrays which have heretofore become bad products become usable as good products, and this can contribute to an improvement in the yield of the light emitting element arrays. Also, the external resistors (R1, R2) for limiting the electric current are unnecessary and correspondingly, the mounting space becomes smaller, and this can also contribute to the downsizing of the apparatus.

Next, the output circuit for outputting the transfer pulse φ2 is also comprised of a combination of the MOS transistors P1 and N1, like the previously described output circuit, and the transfer pulse φ2' from the logic section 202 is inputted to the gate terminals thereof which are connected in common. Also, the input and output signals are opposite in phase to each other, and the transfer pulse φ2' is reversed and is supplied as the transfer pulse φ2 to the clock line CL2. The transfer pulse φ2 is likewise directly supplied to the clock line CL2. Also, the MOS transistor N2 is connected in series with the MOS transistor N1, and the control voltage $V_G$ of the gate terminal thereof is varied to thereby vary the resistance value across the drain source of the MOS transistor N2. When the transfer pulse φ2' of the logic section 202 assumes a high level and the transfer pulse φ2 assumes a low level as shown in FIG. 2C, for example, the switch element S2 of the even number switch elements is switched on and a driving current flows to the switch element S2. Again in this case, during adjustment, the control voltage $V_G$ of the gate terminal of the MOS transistor N2 is varied, whereby the resistance value is adjusted so that the operating current of the switch elements may fall within a range in which normal transfer can be effected. Accordingly, again in this case, the operating current can be adjusted simply and within a short time, and this can also contribute to an improvement in the yield of the light emitting element arrays.

Lastly, the output circuit for outputting the driving signal φI is also comprised of a combination of MOS transistors P3 and N5, and the driving signal φI' from the logic section 202 is inputted to the gate terminals thereof connected in common. The output circuit is such that the input and output thereof are opposite in phase to each other, and the driving signal φI' is reversed and is supplied as the driving signal φI as shown in FIG. 2D to the clock line CLI through a resistor RI. That is, when the driving signal φI' from the logic section 202 assumes a low level, the MOS transistor P3 is turned on and the MOS transistor N5 is turned off, and from the output thereof, a driving signal φI of a high level as shown in FIG. 2D is supplied to the clock line CLI. Also, when the driving signal φI' assumes a high level, the MOS transistor P3 is turned off and the MOS transistor N5 is turned on, and the driving signal φI of a low level is supplied to the clock line CLI. At this time, any one of the light emitting thyristors is turned on in synchronism with the transferring operation by the switch elements as previously described, and a driving current is supplied for a predetermined time.

In the present embodiment, in order to suppress the irregularity of the emitted light intensity of the light emitting thyristors, the resistance value of the ON resistance of an MOS transistor N5 in the circuit in the drive device 201 is set to a value sufficiently smaller then the resistance value of the resistor RI. Generally, when the light emitting element array as shown in FIG. 3 is used in a recording head and it is used in an image forming apparatus such as a copying apparatus or a printer, to obtain a high quality of image, the irregularity of the emitted light intensity of the light emitting elements should desirably be within ±5%, and more desirably be within ±2%. However, the ON resistance of the MOS transistor N5 in the drive device 201 is great in irregularity, and as great an irregularity as the order of ±20% occurs in some cases. Therefore, the irregularity of the ON resistance appears as the irregularity of the emitted light intensity of the light emitting elements, thus giving birth to the irregularity of the density of the image.

So, the driving current for the light emitting thyristors depends chiefly on the ON resistance of the MOS transistor N5 which is the internal resistance in the route thereof and the resistance of the external resistor RI and therefore, the resistance value of the ON resistance of the MOS transistor N5 which is great in irregularity is made sufficiently smaller than the resistance value of the resistor RI to thereby mitigate the influence of the irregularity of the ON resistance of the MOS transistor which appears in the emitted light intensity. As the resistor RI, use is made of an external resistor (such as a chip resistor) which is inexpensive and good in accuracy. The resistance value of the ON resistance of the MOS transistor N5 may preferably be equal to or less than 10% of the resistance value of the resistor RI, and more preferably be greater than 0% and less than 5%. By doing this, the irregularity of the driving current for the light emitting thyristors can be suppressed and the emitted light intensity can be stabilized. Also, the resistor RI is an external resistor and can, therefore, be simply replaced with another one, and can easily change the emitted light intensity of the light emitting thyristors.

FIG. 4 schematically shows the construction when the light emitting element arrays 101 and drive devices 201 of FIG. 3 are used in a recording head. A plurality of light emitting element arrays 101 are arranged in a row and correspondingly thereto, drive devices 201 are arranged. The light emitting element arrays 101 are carried on a substrate, and the drive devices 201 are also integrated and carried as a drive IC on the substrate, and required light emitting element arrays and drive IC are used in conformity with the length of a line, whereby they can be used as the close contact optical system (recording head) of a copying apparatus, a printer or the like. Also, the individual light emitting element arrays and drive devices are electrically connected together by signal lines 301, and the start pulse $\phi S$, transfer pulses $\phi 1$, $\phi 2$ and driving signal $\phi I$ of the drive devices as described above are supplied to the light emitting element arrays through the signal lines 301. In FIG. 4, a light emitting element array is driven by a drive device, but alternatively, a plurality of light emitting element arrays can be driven by a drive device. Also, the start pulse $\phi S$ may be imparted from a drive device in common to the light emitting element arrays.

Figure 5:
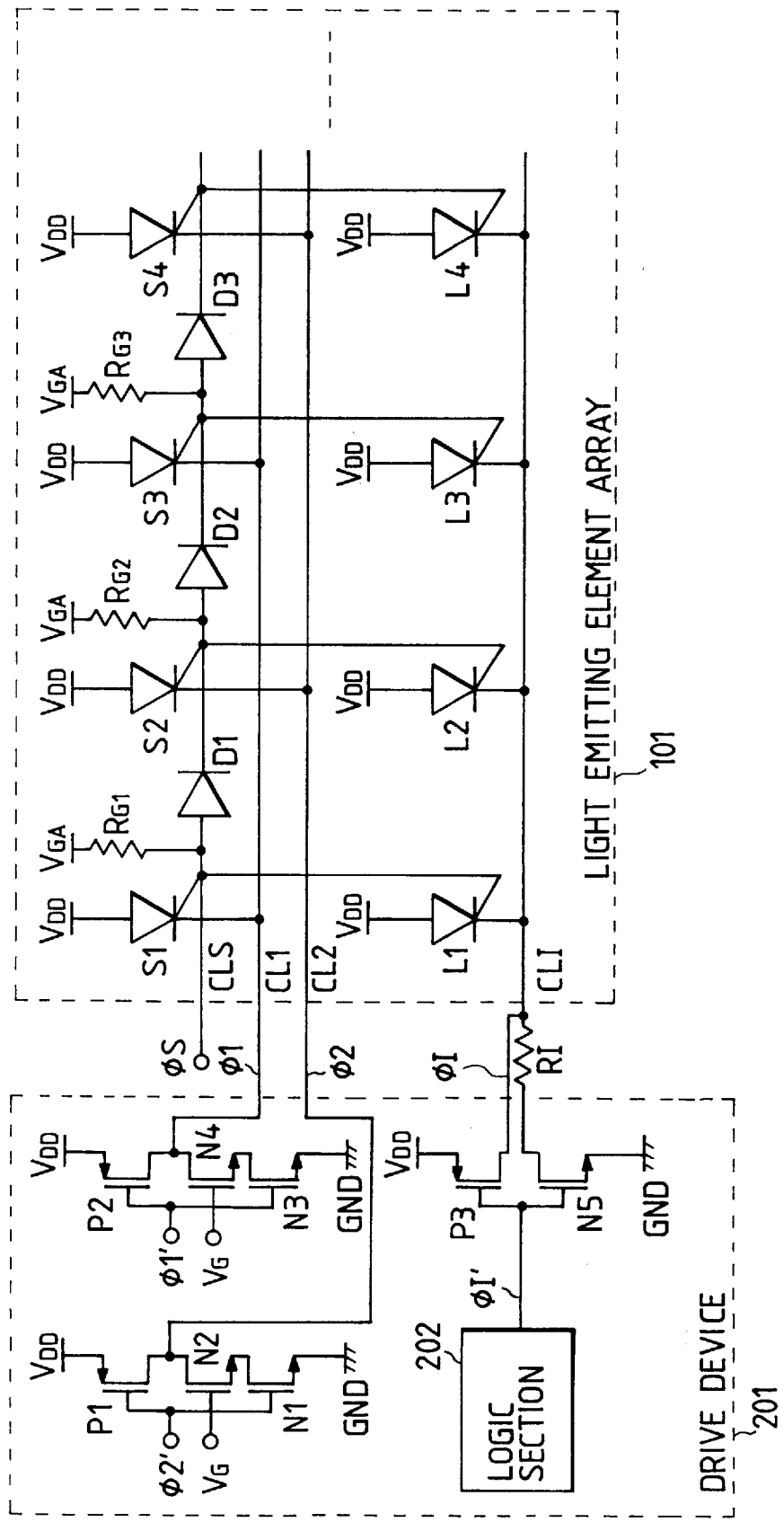
FIG. 5 is a circuit diagram showing another embodiment of the present invention.

FIG. 5 is a circuit diagram showing another embodiment of the present invention. This embodiment is one in which the connected positions of the MOS transistors N2 and N4 for adjusting the driving current for the switch elements are changed. That is, in the output circuit for outputting the transfer pulse $\phi 1$, the MOS transistor N4 for adjusting the electric current is connected between the MOS transistors P2 and N3, and also in the output circuit for outputting the transfer pulse $\phi 2$, the MOS transistor N2 for adjusting the electric current is connected between the MOS transistors P1 and N1. In any of these output circuits, the MOS transistor for adjusting the electric current is provided in the route of the driving current for the switch elements, and the control voltage $V_G$ of the gate terminal thereof is varied, whereby the electric currents of the switch elements can be adjusted. Accordingly, again in this embodiment, similarly to the embodiment of FIG. 3, the operating current of the switch elements is adjusted so as to fall within a range in which normal transfer can be effected, whereby the simplification of the adjustment can be achieved, and this can also contribute to an improvement in the yield of the light emitting element arrays.

Also, in FIG. 5, the connected point of the drain terminal of the MOS transistor P3 in the output circuit for outputting the driving signal $\phi I$ differs from the embodiment shown in FIG. 3. In the present embodiment, the drain terminal of the MOS transistor P3 is connected to the clock line CLI side. In the other points, this embodiment is the same as the embodiment of FIG. 3, and the resistance value of the ON resistance of the MOS transistor N5 is made sufficiently smaller than the resistance value of the resistor RI. Such a construction, entirely similarly to the embodiment of FIG. 3, can mitigate the influence of the irregularity of the ON resistance of the MOS transistor, and can stabilize the emitted light intensity of the light emitting thyristors.

As has been described above, according to the present invention, the electric current of the switch elements for transfer is adjusted by varying the control voltage of the variable resistor and therefore, not only the electric current of the switch elements can be adjusted simply and within a short time, but also it can contribute to an improvement in the yield of the light emitting element arrays. Also, the resistance value of the internal resistor in the output circuit for outputting the driving signal is made substantially smaller than the resistance value of the external resistor for limiting the electric current, whereby it becomes possible to suppress the irregularity of the recording intensity of the light emitting elements, and this can contribute to an improvement in the image quality.

Figure 6:
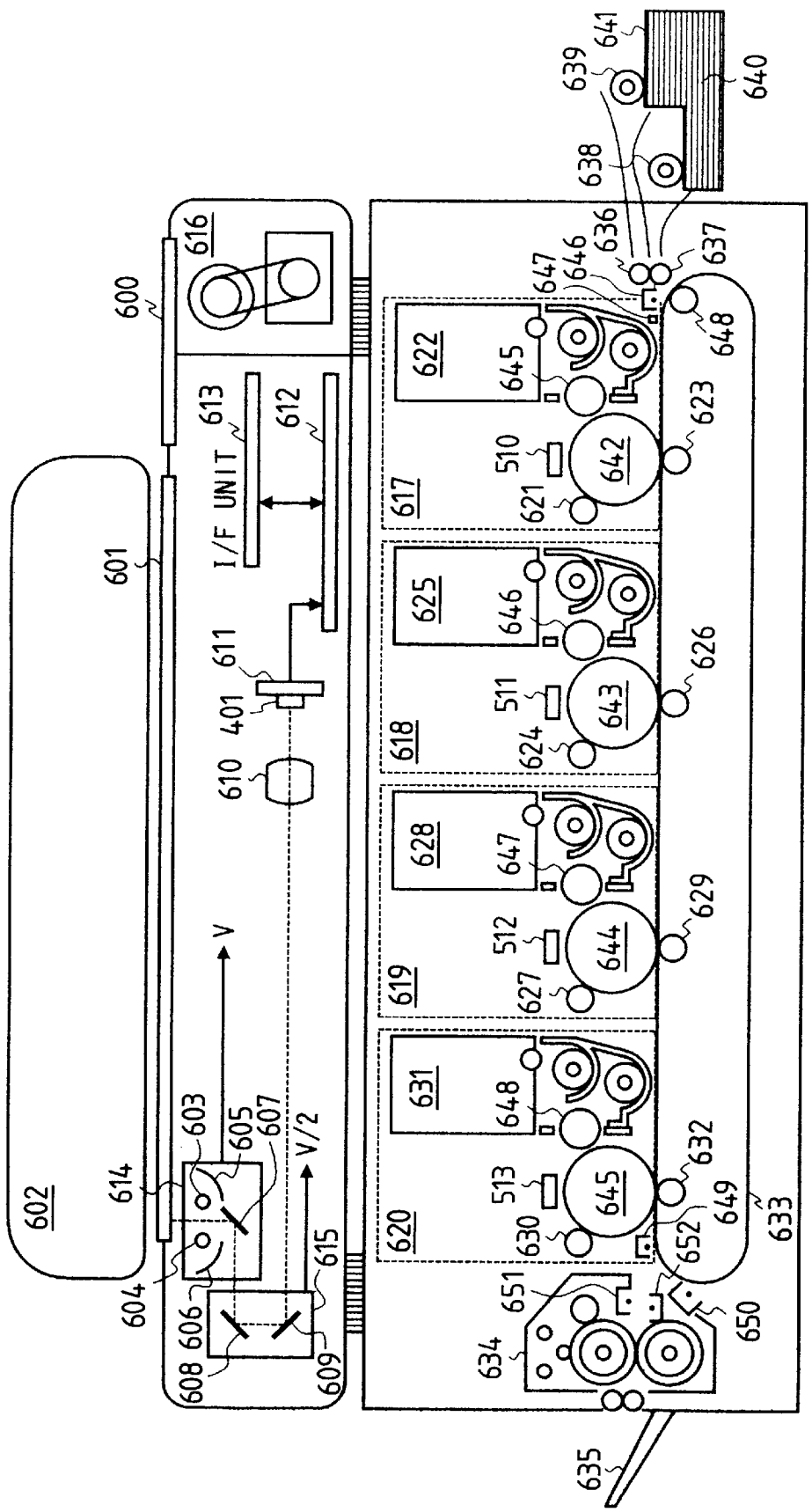
FIG. 6 schematically shows the construction of a color copying apparatus using the recording head of the present invention.

A description will hereinafter be made of a specific embodiment of an image forming apparatus using the recording head according to the above-described embodiment of the present invention. FIG. 6 schematically shows the construction of a color copying apparatus using the recording head of the present invention, FIGS. 7A and 7B are block diagrams showing the construction of a digital image processing unit 612, and FIG. 8 is a block diagram showing the construction of an image recording section.

The construction of the color copying apparatus of FIG. 6 will hereinafter be described with respect to a color reader section and a printer section, and the recording head of the present invention constitutes a recording head drive section and a recording head section in the printer section which will be described later.

(Color Reader Section)

Figures 7, 7A:
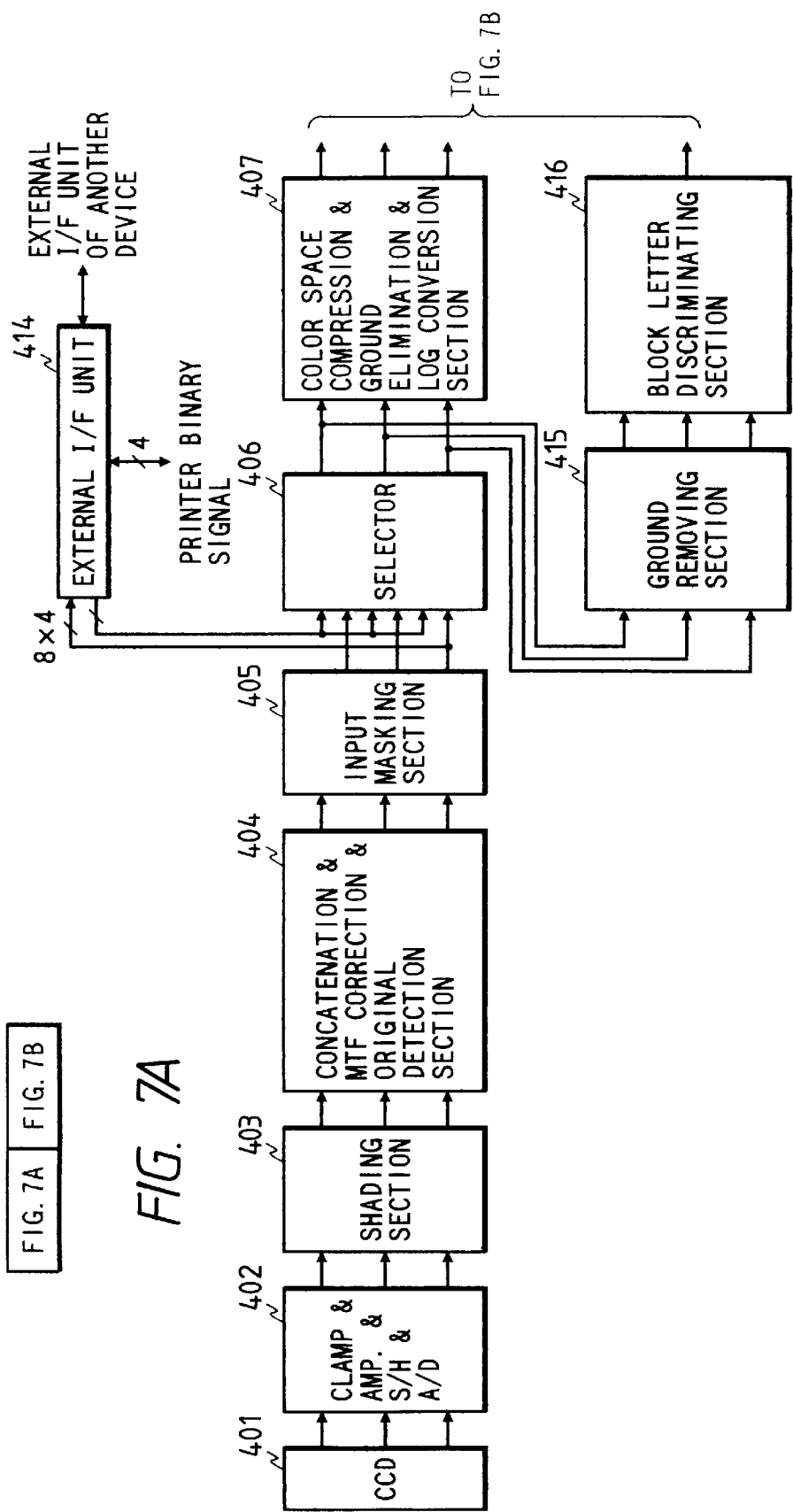
FIG. 7 is comprised of FIGS. 7A and 7B illustrating block diagrams showing the detailed construction of a digital image processing unit 612.
Figure 7B:
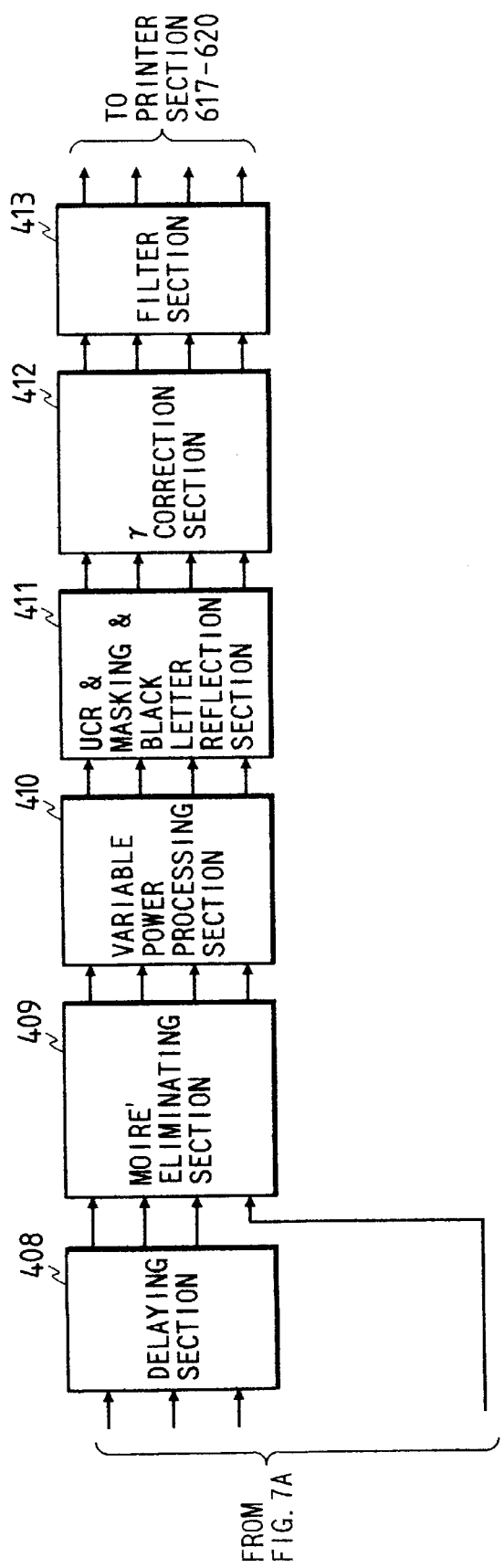
Figure 8:
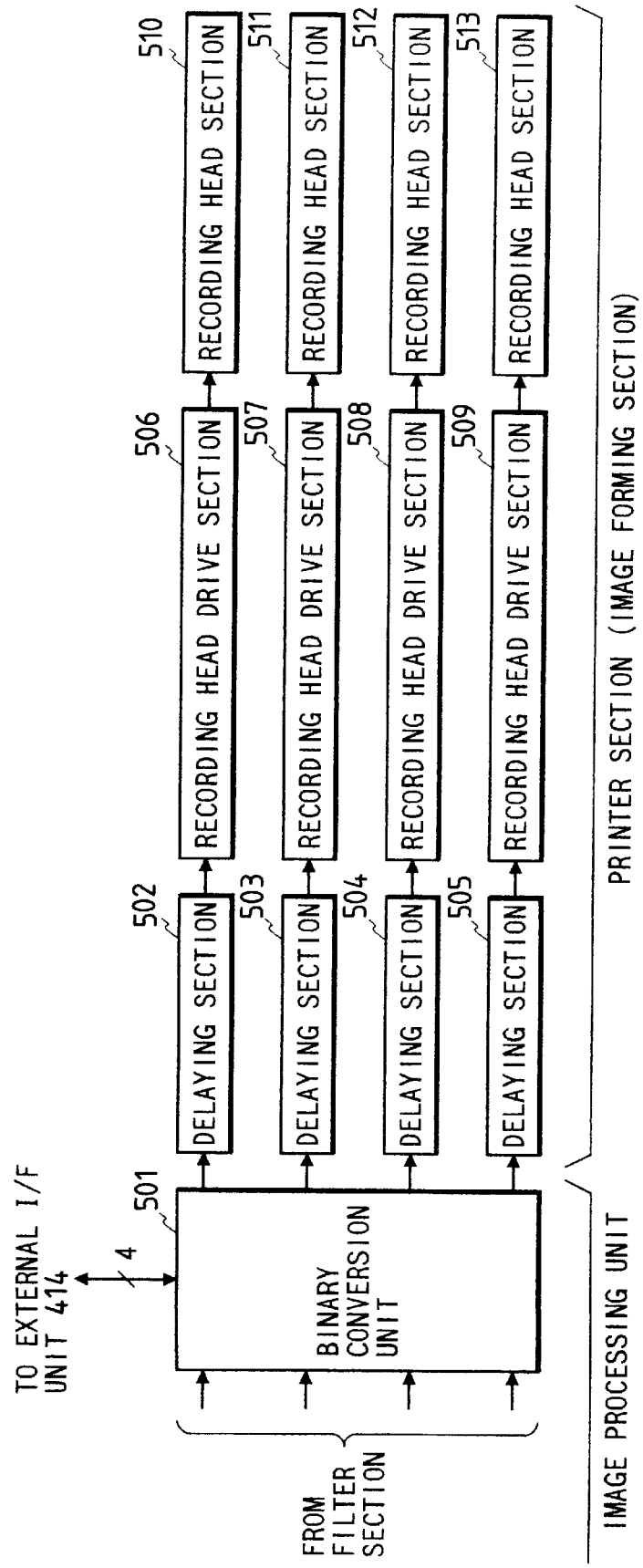
FIG. 8 is a block diagram showing the construction of an image recording section.

The color reader section is shown in the upper portion of FIG. 6, and in FIG. 6, reference numeral 401 designates a CCD, reference numeral 611 denotes a substrate on which the CCD 401 is actually mounted, reference numeral 612 designates an image processing unit including a portion excluding the CCD 401 of the image processing unit of FIG. 7A and the portions 501 and 502–505 of FIG. 8, reference numeral 601 denotes original supporting table glass (platen), reference numeral 602 designates an original feeding device (DF) (instead of this original feeding device 602, there is also a construction in which a mirror surface pressure plate, not shown, may be mounted), reference numerals 603 and 604 denote light sources (halogen lamps or fluorescent lamps) for illuminating an original, reference numerals 605 and 606 designate reflectors for condensing the lights of the light sources 603 and 604 onto the original, reference numerals 607–609 denote mirrors, reference numeral 610 designates a lens for condensing the reflected light or the projected light from the original onto the CCD 401, reference numeral 614 denotes a carriage containing the halogen lamps 603, 604, the reflectors 605, 606 and the mirror 607 therein, reference numeral 615 designates a carriage containing the mirrors 608 and 609 therein and reference numeral 613 denotes an interface (I/F) unit with IPU or the like. The carriages 614 and 615 are mechanically moved at speeds V and V/2, respectively, perpendicularly to the electrical scanning (main scanning) direction of the CCD 401 to thereby scan (sub-scan) the whole surface of the original. Reference numeral 600 designates the operating section of the copying apparatus, and reference numeral 616 denotes drive means for the carriages 614 and 615.

FIGS. 7A and 7B are block diagrams showing the detailed construction of the digital image processing unit 612. The original on the original supporting table glass reflects the lights from the light sources 603 and 604, and the reflected light is directed to the CCD 401, by which it is converted into an electrical signal (in the case of a color sensor, the CCD 401 may be one in which color filters R, G and B ride on one-line CCD in line in the order of R, G and B are arranged for each CCD, or one in which filters are made into an on-chip or the filters are discrete in construction from the CCD). The electrical signal (analog image signal) is inputted to the image processing unit 612, and is sample-held (S/H) by a Clamp & Amp. & S/H & A/D section 402, and the dark level of the analog image signal is clamped into reference potential, and the analog image signal is amplified to a predetermined amount (the above-mentioned order of processing is not limited to the described order), and is A/D-converted, for example, into a digital signal of 8 bits for each of R, G and B. The RGB signal is subjected to shading correction and black correction in a shading section 403, whereafter in a concatenation & MTF correction & original detection section 404, when the CCD 401 is a three-line CCD, the concatenation process is such that the reading position between the lines differs and therefore, the amount of delay for each line is adjusted in conformity with the reading speed, and the signal timing is corrected so that the reading positions are corrected so that the reading positions for the three lines may become the same. Because the MTF correction changes in the MTF of reading depending on the reading speed and the variable power rate, the change is corrected. As regards the detection of the original, the original on the original supporting table glass is scanned, whereby the size of the original is recognized. The digital signal of which the reading position timing has been corrected corrects the spectral characteristic of the CCD 401 and the spectral characteristics of the light sources 603, 604 and the reflectors 605, 606 by an input masking section 405. The output of the input masking section 405 is inputted to a selector 406 capable of changing over the external I/F signal from an external I/F unit 414 in the I/F section 613. The signal outputted from the selector 406 is inputted to a color space compression & ground elimination & log conversion section 407 and a ground removing section 415. The signal inputted to the ground removing section 415 is ground-removed, and is inputted to a black letter discriminating section 416 for discriminating whether the signal is a black letter in the original, and produces a black letter signal from the original. Also, in the color space compression & ground elimination & log conversion section 407 to which another output of the selector 406 has been inputted, the color space compression judges whether the read image signal is within a range which can be reproduced by the printer, and when it is within that range, the image signal is left as it is, and when it is not within that range, the image signal is corrected so as to be within the range which can be reproduced by the printer. Then, the ground eliminating process is carried out, and the signal is converted from RGB signal into CMY signal by log conversion. Then, in order to correct the timing with the signal produced by the black letter discriminating section 416, the output signal of the color space compression & ground elimination & log conversion section 407 has its timing adjusted by a delaying section 408. These two kinds of signals have their moire eliminated by a moire eliminating section 409, and are variable-power-processed in the main scanning direction by a variable power processing section 410. Reference numeral 411 designates a UCR & masking & black letter reflection section, and the signal processed by the variable power processing section 410 is subjected to the UCR-processing to produce a CMYK signal, which is corrected by a masking processing section into a signal conforming to the output of the printer, and the discrimination signal produced by the black letter discriminating section 416 is fed back to the CMYK signal. The signal processed by the UCR & masking & black letter reflection section 411 is density-adjusted by a γ correction section 412, whereafter it is smoothed or edge-processed by a filter section 413. The signal processed as described above is converted from an 8-bit multivalue signal into a binary signal by a binary conversion unit 501 shown in FIG. 8. (The converting method may be any of the dither method, the error diffusing method and improved error diffusion.)

(Printer Section)

The printer section is shown in the lower portion of FIG. 6, and reference numeral 617 designates an M image forming section, reference numeral 618 denotes a C image forming section, reference numeral 619 designates a Y image forming section, and reference numeral 620 denotes a K image forming section, and these sections are the same in construction and therefore, the M image forming section 617 will be described in detail here and the other image forming sections need not be described. The recording head of the present invention constitutes recording head drive sections 506–509 and recording head sections 510–513, and is shown in FIG. 8.

As shown in FIG. 6, in the M image forming section 617, reference numeral 642 designates a photosensitive drum, on the surface of which a latent image is formed by the light from the recording head section 510. Reference numeral 621 denotes a primary charger which charges the surface of the photosensitive drum 642 to predetermined potential and prepares for the formation of a latent image. Reference numeral 622 designates a developing device which develops the latent image on the photosensitive drum 642 to thereby form a toner image. The developing device 622 includes a sleeve 645 for applying a developing bias to thereby develop the latent image. Reference numeral 623 denotes a transfer charger which effects discharging from the back of a transfer belt 633 and transfers the toner image on the photosensitive drum 642 to a recording paper or the like on the transfer belt 633. In the present embodiment, the transfer efficiency is good and therefore, a cleaner section is not provided (Of course, there will be no problem even if a cleaner section is mounted).

Description will now be made for procedure of forming an image on a recording sheet or the like. Recording sheets contained in cassettes 640 and 641 are supplied one by one onto the transfer belt 633 by pickup rollers 639 and 638 by the use of paper supply rollers 636 and 637. The supplied recording sheet is charged by an absorption charger 646. Reference numeral 648 designates a transfer belt roller which drives a transfer belt 633 and forms a pair with the absorption charger 646 to charge the recording sheet or the like and causes the recording sheet or the like to be absorbed to the transfer belt 633. Reference numeral 647 denotes a paper leading end sensor which detects the leading end of the recording sheet or the like on the transfer belt 633. The detection signal of the paper leading end sensor is sent from the printer section to the color reader section, and is used as a sub-scanning synchronous signal when a video signal is sent from the color reader section to the printer section.

Thereafter, the recording sheet or the like is conveyed by the transfer belt 633 and in the image forming sections 617–620, toner images are formed on the surface thereof in the order of M, C, Y and K. The recording sheet or the like which has passed through the K image forming section 620 has its charges removed by a charge removing charger 649 to facilitate the separation thereof from the transfer belt 633, whereafter it is separated from the transfer belt 633. Reference numeral 650 designates a peeling charger which prevents the disturbance of the image by the peeling discharger when the recording sheet or the like is separated from the transfer belt 633. The thus separated recording sheet or the like is charged by before-fixation chargers 651 and 652 to supplement the absorbing force of the toner and prevent the disturbance of the image, whereafter the toner image thereon is heat-fixated by a fixating device 634, and thereafter the recording sheet is discharged onto a paper discharge tray 635.

The image recording by the recording head will now be described. As shown in FIG. 8, the CMYK image signal produced by the image processing unit of FIGS. 7A and 7B is binarized by the binary conversion unit 501. The binarized CMYK image signal is respectively subjected to adjustment of a difference between the distances between the paper leading end sensor 647 and the respective image forming sections 617–620 by delaying sections 502–505, whereby it becomes possible to print the four colors at a predetermined position. The recording head drive sections 506–509 produce signals for driving the recording head sections 510–513. The light emitting elements (recording head sections) arranged in a row emit light or are turned off in conformity with a recording signal (image signal) and effect recording on the photosensitive drum.

In the above-described image forming apparatus using the recording head of the present invention, it becomes possible to effect the adjustment of the light emitting element array easily and also, it becomes possible to suppress the irregularity of the recording intensity of the light emitting elements, and this can contribute to an improvement in the image quality.

What we claim is:

1. A recording head comprising:

a light emitting element array comprising a plurality of light emitting elements and a plurality of switch elements, said plurality of switch elements scanning said plurality of light emitting elements; and a drive device, said drive device driving said light emitting element array, said drive device having a variable resistor in a route for supplying a driving current to said plurality of switch elements, wherein a control voltage of said variable resistor is varied to thereby adjust the driving current for said plurality of switch elements.

2. A recording head comprising:

a light emitting element array comprising a plurality of light emitting elements and a plurality of switch elements, said plurality of switch elements scanning said plurality of light emitting elements;

a drive device, said drive device driving said light emitting element array, said drive device supplying a driving current to said plurality of light emitting elements, said drive device comprising an output circuit for outputting the driving current, said output circuit including an internal resistor; and an external resistor provided in a route for supplying the driving current from said drive device to said plurality of light emitting elements, wherein a resistance value of said internal resistor is smaller than a resistance value of said external resistor.

3. A recording head according to claim 2, wherein the resistance value of said internal resistor is equal to or less than 10% of the resistance value of said external resistor.

4. An image forming apparatus comprising:

a light emitting element array comprising a plurality of light emitting elements and a plurality of switch elements, said plurality of switch elements scanning said plurality of light emitting elements;

a drive device, said drive device driving said light emitting element array, said drive device having a variable resistor element in a route for supplying a driving current to said plurality of switch elements; and a photosensitive medium on which recording is effected by said light emitting element array, wherein a control voltage of said variable resistor element is varied to thereby adjust the driving current for said plurality of switch elements.

5. An image forming apparatus comprising:

a light emitting element array comprising a plurality of light emitting elements and a plurality of switch elements, said plurality of switch elements scanning said plurality of light emitting elements;

a drive device, said drive device driving said light emitting element array, said drive device supplying a driving current to said plurality of light emitting elements, said drive device comprising an output circuit for outputting the driving current, said output circuit including an internal resistor;

an external resistor provided in a route for supplying the driving current from said drive device to said plurality of light emitting elements; and a photosensitive medium on which recording is effected by said light emitting element array, wherein a resistance value of said internal resistor is smaller than a resistance value of said external resistor.

6. An image forming apparatus according to claim 5, wherein the resistance value of said internal resistor is equal to or less than 10% of the resistance value of said external resistor.

* * * * *

UNITED STATES PATENT AND TRADEMARK OFFICE
CERTIFICATE OF CORRECTION

PATENT NO. : 5,969,744

DATED : October 19, 1999

INVENTOR(S): YUKIHIKO SAKASHITA, ET AL.

It is certified that error appears in the above-identified patent and that said Letters Patent is hereby corrected as shown below:

COLUMN 2:
Line 34, "thyristor," should read --thyristors,--; and
Line 36, "thyristors" should read --thyristors--.

COLUMN 8:
Line 53, "therein" should read --therein,--.

COLUMN 9:
Line 1, "ride" should read --that ride--.

COLUMN 10
Line 38, "provided" should read --provided.--.

Signed and Sealed this

Twenty-fourth Day of October, 2000

Attest:

Q. TODD DICKINSON

*Attesting Officer*    *Director of Patents and Trademarks*